United States Patent
Myers et al.

(10) Patent No.: US 8,488,280 B1
(45) Date of Patent: Jul. 16, 2013

(54) DISK DRIVE ACTUATOR LATCH INCLUDING AN INTEGRALLY FORMED ENGAGEMENT PORTION THAT ENGAGES AND LIMITS ROTATION OF A DISK DRIVE ACTUATOR

(75) Inventors: David K. Myers, Campbell, CA (US); Raymond Quines, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 256 days.

(21) Appl. No.: 12/828,126

(22) Filed: Jun. 30, 2010

(51) Int. Cl.
*G11B 5/54* (2006.01)
(52) U.S. Cl.
USPC ........................................... 360/256.2
(58) Field of Classification Search
None
See application file for complete search history.

(56) References Cited

U.S. PATENT DOCUMENTS

| | | |
|---|---|---|
| 4,562,500 A | 12/1985 | Bygdnes |
| 5,402,290 A | 3/1995 | Daniel |
| 5,455,728 A | 10/1995 | Edwards et al. |
| 5,703,735 A | 12/1997 | Bleeke |
| 5,815,350 A | 9/1998 | Kennedy et al. |
| 5,822,155 A | 10/1998 | Oveyssi et al. |
| 5,870,256 A * | 2/1999 | Khanna et al. ............. 360/256.4 |
| 5,982,587 A | 11/1999 | Alagheband et al. |
| 6,185,074 B1 | 2/2001 | Wang et al. |
| 6,198,603 B1 * | 3/2001 | West ............................ 360/256 |
| 6,469,871 B1 | 10/2002 | Wang |
| 6,535,357 B1 | 3/2003 | Misso et al. |
| 6,535,358 B1 | 3/2003 | Hauert et al. |
| 6,574,073 B1 | 6/2003 | Hauert et al. |
| 6,624,980 B1 | 9/2003 | Watson et al. |
| 6,704,167 B1 | 3/2004 | Scura et al. |
| 6,710,980 B1 | 3/2004 | Hauert et al. |
| 6,744,604 B2 | 6/2004 | Misso |
| 7,050,269 B2 | 5/2006 | Hong et al. |
| 7,610,672 B1 * | 11/2009 | Liebman ................... 29/603.03 |
| 7,633,721 B1 | 12/2009 | Little et al. |
| 7,660,075 B1 | 2/2010 | Lin et al. |
| 7,684,155 B1 | 3/2010 | Huang et al. |

* cited by examiner

*Primary Examiner* — David D Davis

(57) ABSTRACT

Described herein is an actuator latch, for limiting rotational movement of a disk drive actuator. The latch preferably includes a coupling portion that has an elongate member received by a bore in a disk drive base. The coupling portion is configured to be rotatable about an axis defined by the elongate member. The latch also includes an engagement portion, integrally formed with the elongate member, that extends in a direction transverse to the axis and engages and limits rotation of a disk drive actuator.

20 Claims, 6 Drawing Sheets

DISK DRIVE ACTUATOR LATCH INCLUDING AN INTEGRALLY FORMED ENGAGEMENT PORTION THAT ENGAGES AND LIMITS ROTATION OF A DISK DRIVE ACTUATOR

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
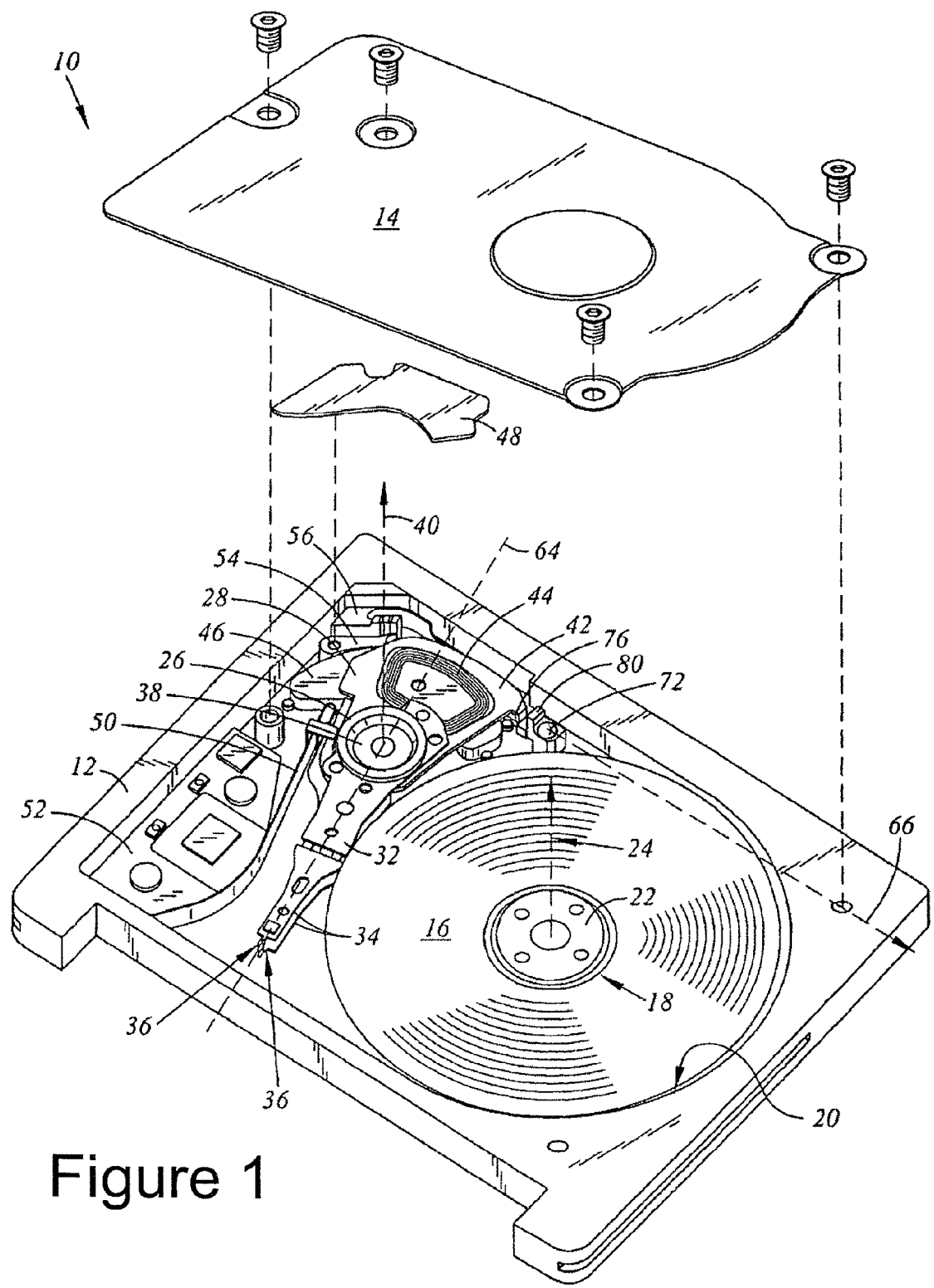
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a coupling portion 56 that is coupled to the disk drive base 12. The latch 54 further includes a latching portion 58 (FIG. 2) that, with the coupling portion 56, is configured to limit rotational movement of the actuator 28. Although the latch 54 is depicted as being located in a corner of the base, the latch 54 could be located in other portions of the disk drive, as shown in other embodiments described herein, and still perform its functions. Further embodiments and description of the latch 54 will be provided herein.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity of the actuator arm 32 relative to the disk 16 can adversely affect the performance of the HDD. For example, vibration of the actuator 28 can result in variations in the spacing between the head element and media. Additionally, irregular movement of the disk 16, or vibrations caused by unbalanced rotations, can result in variations in the spacing between the head element and the disk 16, or media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Figure 2:
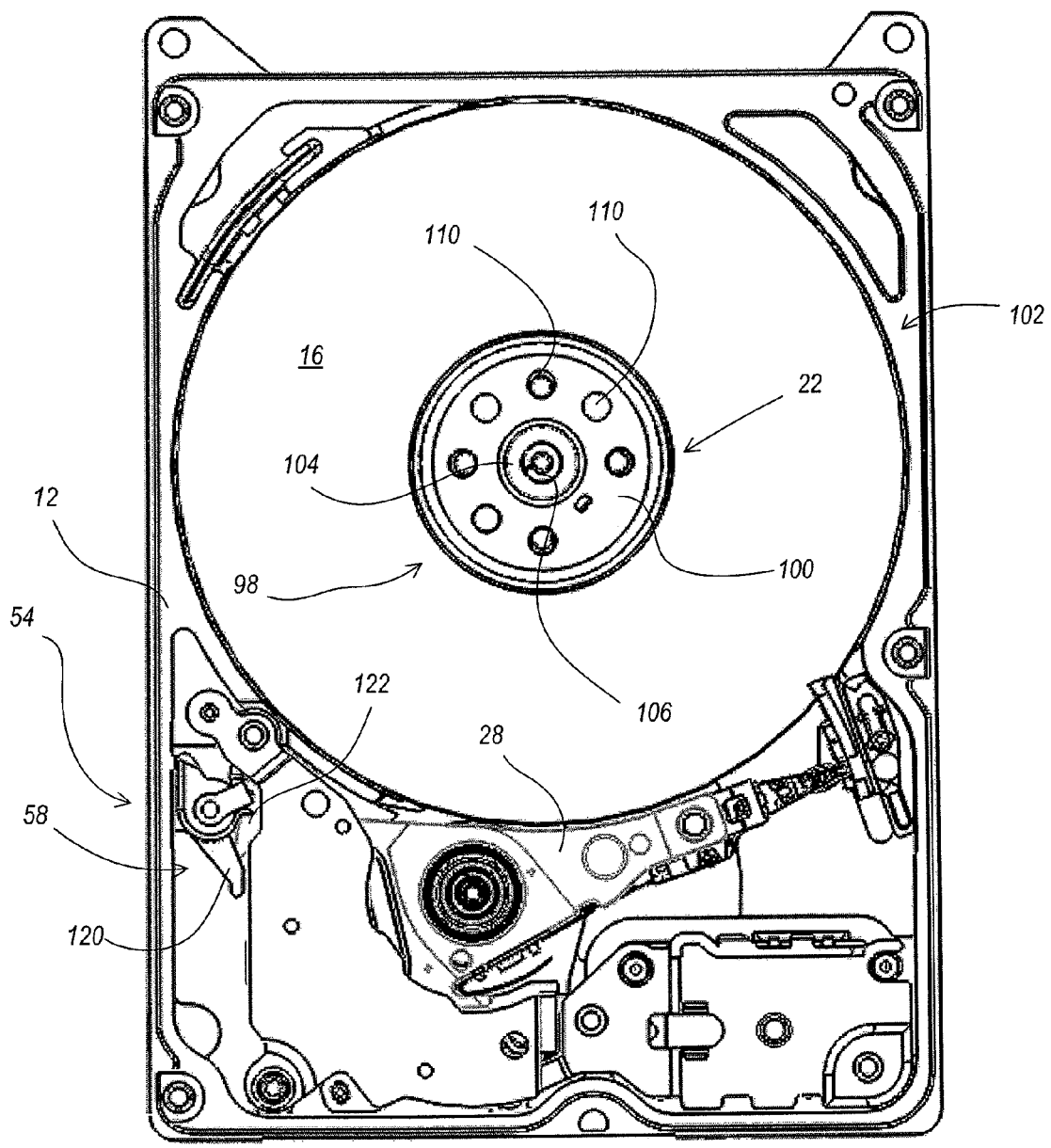
FIG. 2 illustrates a top view of a disk drive in accordance with one embodiment.

Each disk 16 is mounted on a rotatable hub 98 connected to the spindle motor 22 and is secured to the rotatable hub by a disk clamp 100, as illustrated in FIG. 2. Some disk drives 10 include a plurality of disks 16 to provide additional disk surface for storing greater amounts of data. The resulting combination is referred to herein as a motor/disk assembly or as a disk pack 102.

Multiple data storage disks 16 can be mounted on the rotatable hub 98 in vertically and substantially equally spaced relations. One or more bearings 104 are disposed between a motor or spindle shaft 106 and the rotatable hub 98, which is disposed about and rotatable relative to the spindle shaft 106. Electromagnetic forces are used to rotate the hub 98 about the stationary shaft 106 at a desired velocity. Rotational movement of the hub 98 is translated to each of the disks 16 of the disk pack 102, causing the disks 16 to rotate with the hub 98 about the shaft 106.

The disks 16 are rotated about the shaft 106 at a high rate of speed, and consumer demand for quicker data retrieval can result in increased rotational speed of the hub 98 and the disks 16 to provide reduced time in accessing data. Even minor imbalances of the rotating motor/disk assembly 102 can generate significant forces that can adversely affect the ability to accurately position the head 36 relative to the desired track of the corresponding disk 16 while reading from or writing to the disk 16. Excessive imbalance can degrade the disk drive performance not only in terms of read/write errors, but also in terms of seek times. Excessive imbalance may result in an undesirable acoustic signature and may even result in damage or excessive wear to various disk drive components, particularly if the actuator 28 is permitted to operate and travel over the imbalanced disk 16 surfaces or during non-operational periods.

The inner diameter 18 of each disk 16 is slightly larger in diameter than an outer periphery of the spindle motor hub, or rotatable hub 98, in order to allow the disks 16 to slip about the spindle motor hub 98 during installation. During assembly, the disks 16 may be positioned in an inexact concentric manner about the spindle motor hub 98. In fact, in some instances, the disks 16 may be intentionally biased against the spindle motor hub 98. This inexact concentric relationship between the disk 16 and the motor hub 98 results in the disk pack 102 becoming imbalanced. This imbalance can be manifest in at least two respects.

First, the rotating mass of each disk 16 results in a centrifugal force radially extending in a direction from the axis of rotation 24 in a plane orthogonal to the axis of rotation 24. This can be referred to as a single plane or "static" imbalance. Second, the same centrifugal force also results in a moment about an axis, extending from the axis of rotation 24, as a result of the coupling of two different planes of imbalance, each of which are orthogonal to the axis of rotation 24. This can referred to as a dual plane, two plane, or "dynamic" imbalance.

Balancing of the disk pack 102 is preferably conducted, for example, by the manufacturer or during an assembly process, prior to shipping the drive 10 to the consumer. Single plane balancing of the disk pack 102 can include attaching one or more weights to one side of the disk pack 102. Not all imbalances may be alleviated to the desired degree by balancing within a single plane. Dual plane balancing of the disk pack 102 can be achieved by attaching one or more weights at two different elevations along the axis 24 corresponding with vertically spaced reference planes in an attempt to improve upon the potential inadequacies of a single plane balance.

Balancing the disk pack 102 can be accomplished by attaching one or more weights to a central portion of the disk pack 102. For example, as illustrated in FIG. 2, the disk pack 102 can have a portion that holds the one or more weights or to which the one or more weights attach. FIG. 2 illustrates a disk pack 102 having a rotatable hub 98 that includes a disk clamp 100 having a plurality of disk clamp apertures 110 positioned circumferentially about a central portion of the disk pack 102.

Another source of vibrations during disk operation is disk deformations and irregularities that are caused when non-operational shock subjects the disk 16 to very high inertial forces. When a disk 16 is subjected to such non-operational shocks, the disk can experience crack initiation, material yielding, and development of uneven surfaces. These changes in disk structure and profile can result in reduced disk performance because of damage to the recording surfaces of the media or because of vibrations caused by the disk deformations and irregularities.

When the disk 16 is subjected to high inertial forces, such as those experienced during a non-operational shock event, the disk 16 can deflect excessively and, in some instances, may contact the base 12. This contact can cause media damage, especially at the outer diameter 20 of the disk 16, and can reduce the ability of the heads 36 to read and/or write to the location of the disk 16 that has been damaged.

Additionally, if the actuator 28 is permitted to rotate during a non-operational period, there is a risk that the drive 10 may experience in non-operational shock that causes the heads 36 or other portions of the actuator 28 to contact the disks 16 and damage the recording surface of the disk 16 or the actuator 28 itself. Such contact can result in increased operational vibrations and actual damage to operational components of the drive 10. Accordingly, the latch 54 of the drive 10 preferably restricts movement of the actuator 28 when the drive 10 is in a non-operational mode.

FIG. 2 illustrates an embodiment of the latch 54, including a latching portion 58 that engages the actuator 28 during non-operational modes of the disk drive 10. A latching portion 58 includes a latch engagement member 120 that contacts an actuator engagement member 122 during non-operational modes. As will be explained further below, when the drive 10 changes from a non-operational mode to an operational mode, the latch 54 rotates such that the latch engagement member 120 no longer blocks or contacts the actuator engagement member 122, thereby permitting rotational movement of the actuator 28.

Figure 3:
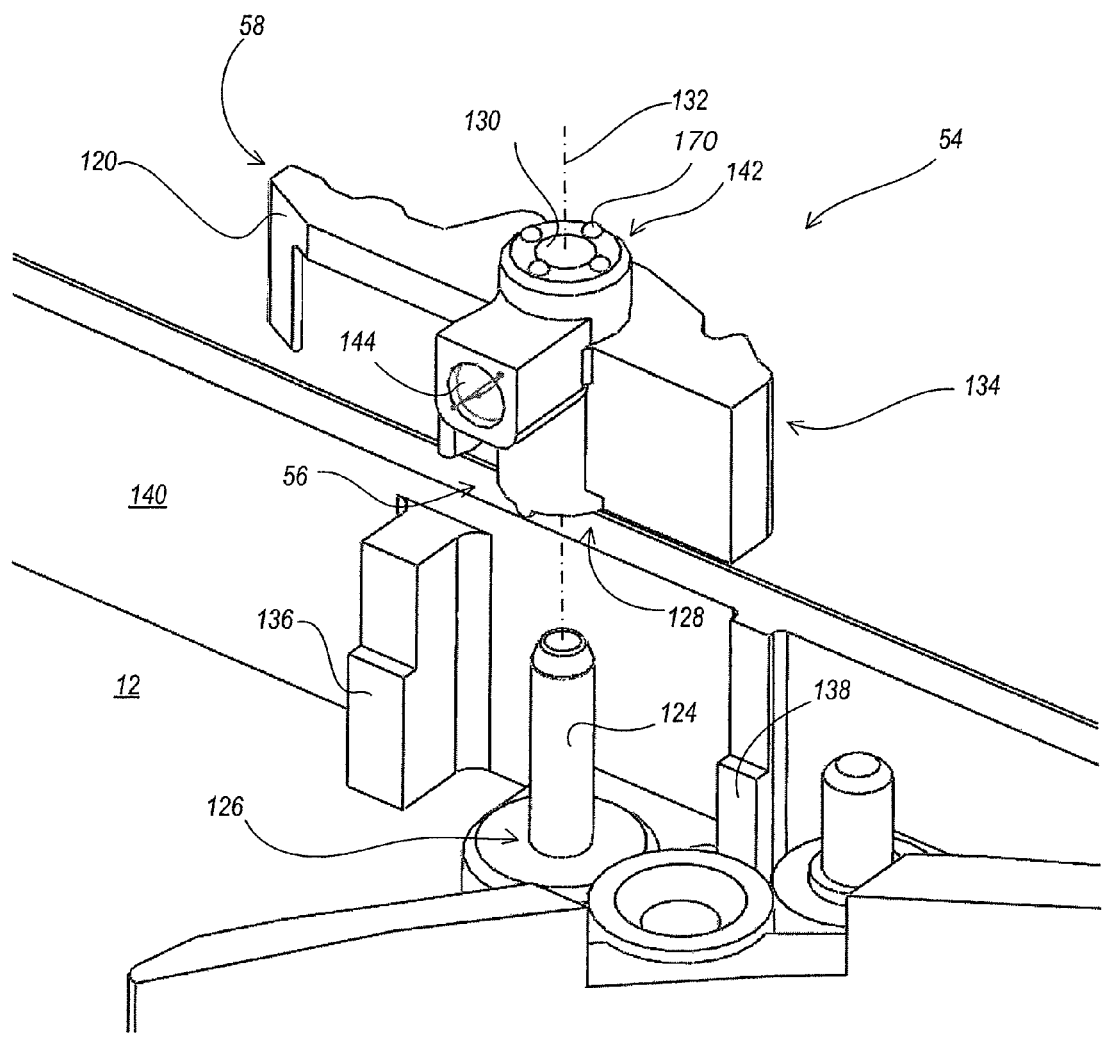
FIG. 3 illustrates a perspective view of an actuator latch and a portion of a disk drive base.

FIG. 3 illustrates an actuator latch 54 that is coupled to the base 12 by a precision pin 124 received with a bore 126 that is formed by the base 12. The latch 54 includes a coupling portion 56 on the bottom portion 128 of the latch 54 that is positioned over the precision pin 124 so as to be coupled to the base 12 by the precision pin 124. The coupling portion 156 provides an axial bore 130 that extends through the latch 54 along an axis of rotation 132.

The latch 54 includes a latching portion 58 that extends in a direction transverse to the axis of rotation 132 and defines a latch engagement member 120. The latch 54 also includes a latch rearward member 134 that extends from the axial bore 130 opposite the latching portion 58. The base 12 includes a forward base stopper 136 and a rear work-based stopper 138 positioned on opposite sides of the axis of rotation 132 relative to a base wall 140.

When the latch 54 is coupled to the base by the precision pin 124 and the bore 126, the latch 54 is rotatable about the axis of rotation 132 such that in a first position, the latch rearward member 134 contacts the rearward base stopper 138. When the latch 54 is rotated to a second position, corresponding to the operational mode of the drive 10, the latching portion 58 engages the forward base stopper 136. Accordingly, the forward base stopper 136 and the rearward base stopper 138 limit the rotation of the latch 54 about the axis of rotation 132, and at least one of the forward base stopper 136 and the rearward base stopper 138 is in contact with the latch 54 during the non-operational mode and the operational mode of the drive 10.

The latch 54 includes a plurality of protrusions 170 positioned along a top portion 142, as illustrated in FIG. 3. Rotation of the latch 54 between the first position, corresponding to the non-operational mode of the drive, and the second position, corresponding to the operational mode of the drive, is actuated by a magnetic member 144 positioned on or in the latch 54. The magnetic member 144 magnetically interacts with the magnet of the actuator voice coil motor so as to manipulate the angular position of the latch 54. The magnetic member 144 may be coupled to the latch 54 by being pressfit within a cavity formed in the latch 54, may be formed integrally with the latch 54, or may be secured to the latch 54, for example, by an adhesive.

Figure 4:
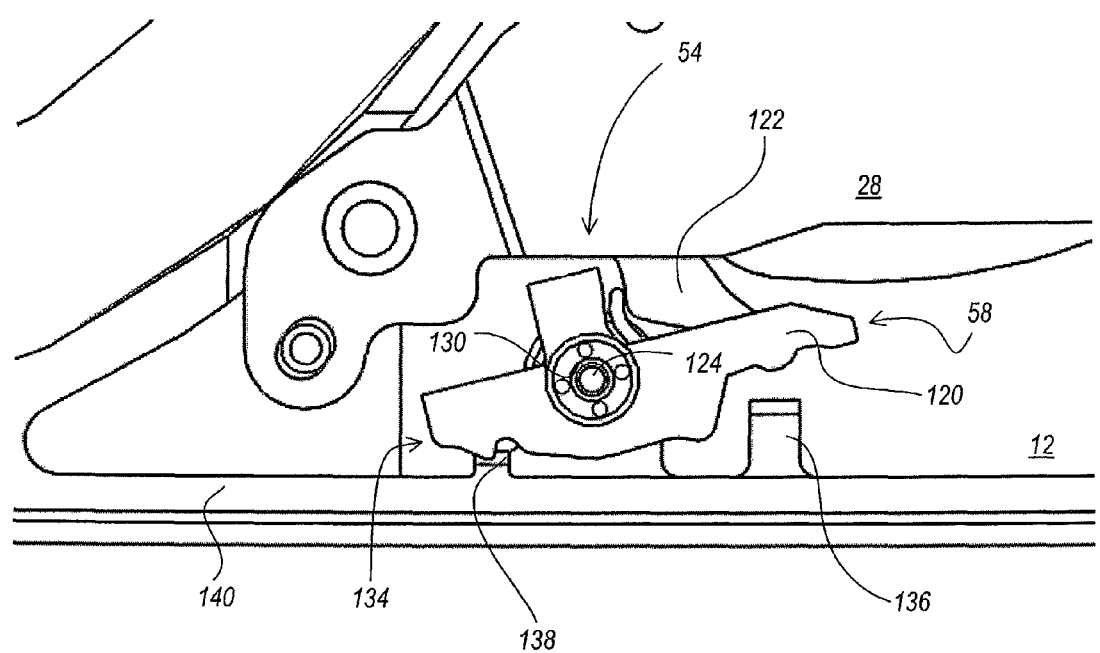
FIG. 4 depicts a top view of an actuator latch in position within a base of a disk drive.

FIG. 4 illustrates a top view of the latch 54 shown in the first position, corresponding with the non-operational mode, with the actuator engagement member 122 in contact with or blocked by the latch engagement member 120. The latch rearward member 134 is depicted as contacting the rearward base stopper 138. When the latch 54 is rotated to the second position, or corresponding with the operational mode, the latch 54 is rotated about the pin 124, shown through the axial bore 130, until the latch engagement member 120 latching portion 58 contacts the forward base stopper 136. In this position, the latch engagement member 120 no longer contacts or blocks the actuator engagement member 122, permitting rotational movement of the actuator 28.

Figure 5:
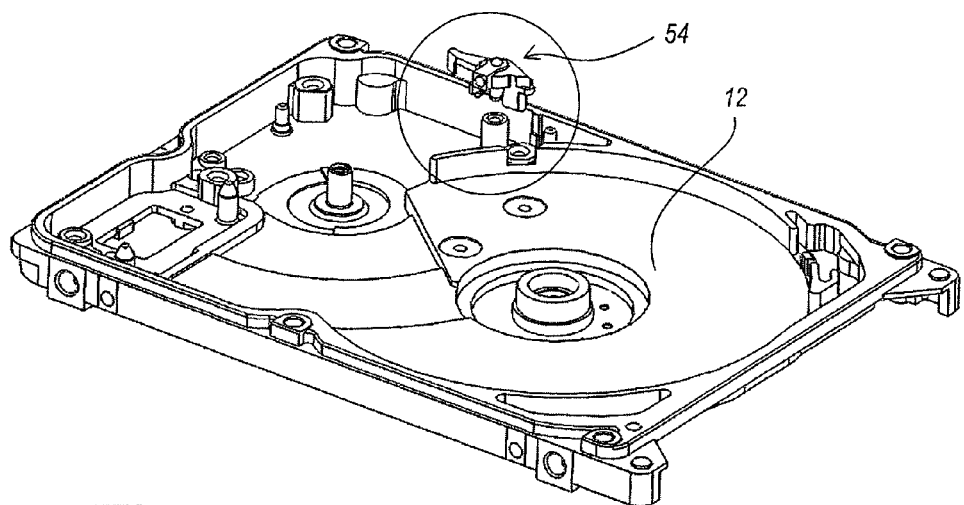
FIG. 5 illustrates a perspective view of a disk drive base and an actuator latch in accordance with one embodiment.
Figure 6:
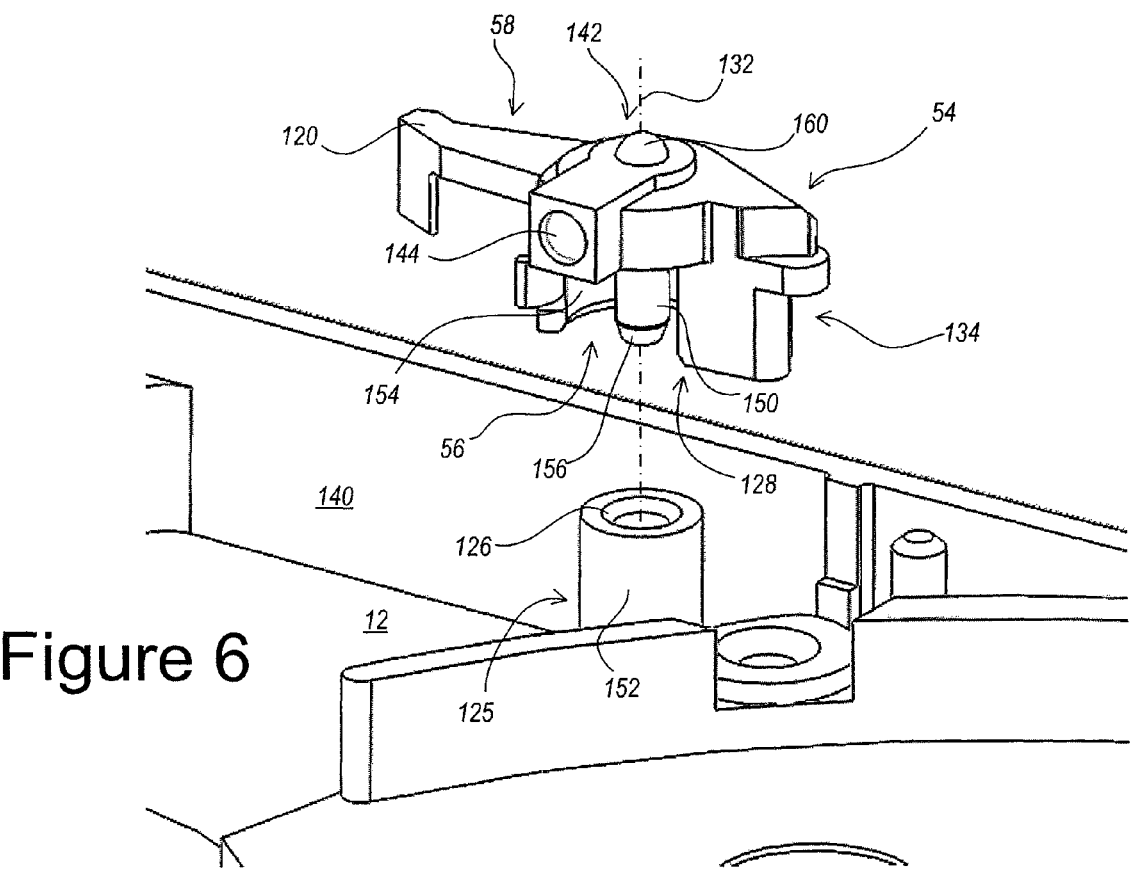
FIG. 6 illustrates a partial perspective view of an actuator latch and a portion of a disk drive base.

FIG. 5 illustrates a partial exploded view of a disk drive base 12 and a latch 54. Although the latch is depicted as being placed adjacent to the disks, the latch 54 can be positioned at other places within the base 12. FIG. 6 provides a closer perspective view of the latch 54 and the base 12. In one embodiment, the latch 54 can have a base, or bottom, portion 128 with a coupling portion 56 that includes an integrated pin 150 extending toward the base 12.

The pin 150 is preferably an elongate member that can be configured to be received within the base for 126, and the base for 126 can have a raised cylindrical wall 152 within which the pin 150 can rotate about axis 132. A latch cylindrical wall 154 can extend toward the base 12 from the latch 54 and preferably does not contact the cylindrical wall 152 of the base 12 as the latch 54 rotates about the axis of rotation 132. The pin 150 can include a tapered portion 156 that can facilitate insertion of the pin 150 within the base for 126.

The top portion 142 of the latch 54 can include a top dome 160 that is aligned along the axis of rotation 132. In some embodiments, the top dome 160 is configured to engage the top cover 14 and to provide an area of contact substantially at the axis of rotation 132 so as to reduce frictional forces between the latch 54 and the top cover 14. In some embodiments, the top dome 160 engages the top cover 14 only in certain orientations of the disk drive 10.

For example, in some embodiments, there may be a space provided between the top dome 160 and the top cover 14, such that when the latch 54 rotates, the top dome 160 does not contact the top cover 14. In some embodiments, the space between the top dome 160 and the top cover 14 is less than a length of the pin 150 that is received within the base bore 126. Accordingly, the latch 54 may be permitted to move axially along the axis of rotation 132, but when the top cover 14 is positioned over the base 12, the latch will not be disengaged with the base bore 126 because the space between the top dome 160 and the top cover 14 is less than the length of the pin 150 that is received within the base bore 126.

Figure 7:
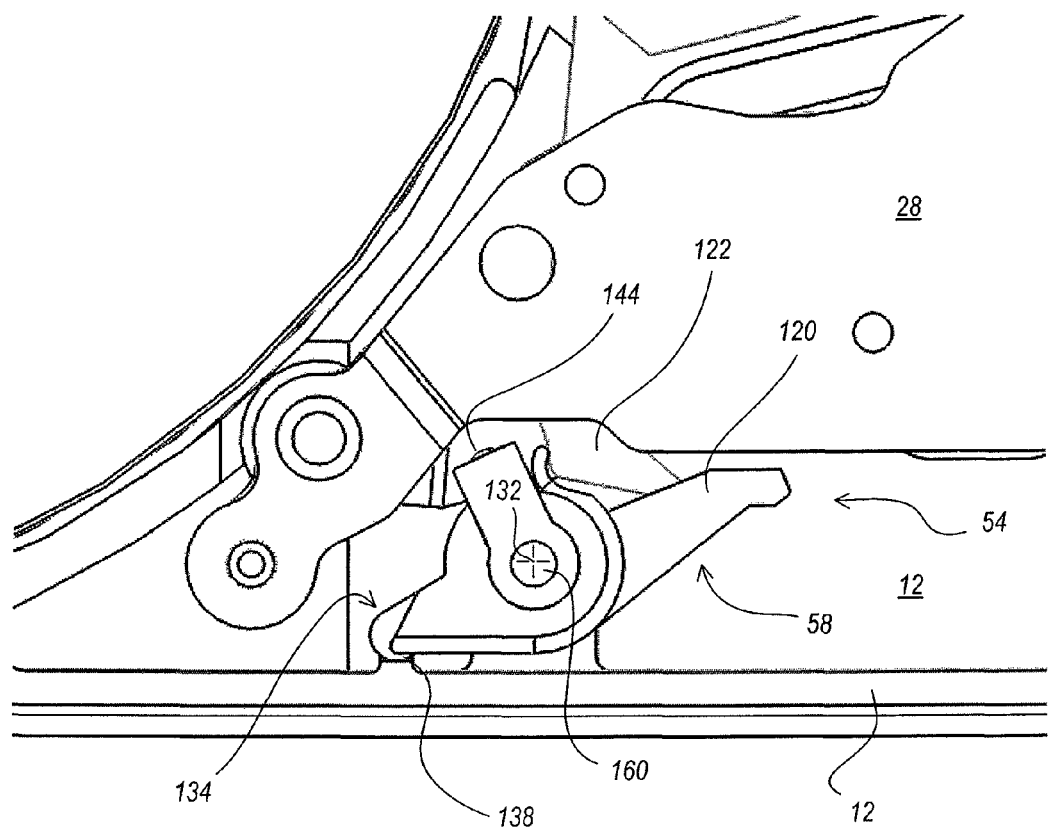
FIG. 7 illustrates a top view of an actuator latch in position within a base of a disk drive in accordance with one embodiment.

FIG. 7 illustrates a top view of the latch 54 with a latching portion 58 including a latch engagement portion 120 extending laterally from the axis of rotation 132. The top dome 160 is positioned aligned with the axis of rotation 132, and the latch 54 includes a latch rearward member 134 extending in a direction substantially opposite to that of the latching portion 58. The latch rearward member 134 is configured to engage the base rearward stopper 138 when the latch 154 is in a first position, corresponding to a non-operational mode of the disk drive 10, such that the latch engagement portion 120 engages the actuator engagement member 122, or restricts rotational movement of the actuator 28.

The latch 154 is configured to rotate about the axis 132, for example by actuating or manipulating the magnetic member 144, such that the latch rearward member 134 no longer engages or contacts the base rearward stopper 138. When the latch 54 is rotated from the first position, the latching portion 58 rotates such that the latch engagement portion 120 no longer blocks the actuator engagement member 122 from rotation. Accordingly, the actuator 28 is then permitted to rotate about its axis, substantially free from engagement or contact with the latching portion 58.

In some embodiments, the base 12 does not include a forward base stopper 136, as illustrated in FIG. 7, such that when the latch 54 is rotated from the first position to a second position, which corresponds to an operational mode of the disk drive 10, the latching portion 58 does not engage the base 12. In such embodiments, the acoustic signature of the disk drive 10 can be improved by not having the latching portion 58, or any part of the latch 54, opposing rotation of the latch 54 by contacting the base 12 when the latch 54 is rotated to the second position.

In one embodiment, the disk drive 10 includes a disk drive base 12 having a coupling portion 125, which can extend from the base 12 and having a bore 126 therein. The coupling portion 125 can also include a cylindrical wall 152. The drive 10 also can include a disk 16, rotatably coupled to the disk drive base 12, and the disk 16 can have a recordable surface. The drive 10 preferably includes an actuator 28 that is rotatably coupled to the disk drive base 12. The actuator 28 can have an actuator arm 32 that is rotatable to a position over the recordable surface when the disk drive 10 is in an operation mode and is rotatable to a position substantially not over the recordable surface when the disk drive 10 is in a non-operation mode. The drive also preferably includes a latch 54 that is rotatably coupled, about an axis of rotation 132, to the coupling portion of the base 12. The latch 54 can include an engagement portion 120 that engages the actuator 28 to limit rotational movement of the actuator 28 when the disk drive 10 is in the non-operation mode and permits rotational movement of the actuator 28 when the disk drive 10 is in the operation mode. The latch 54 can also have a base portion 128 that forms a pin 150. When assembled, the pin 150 is preferably received by the bore 126 of the base coupling portion 125 to provide relative rotational movement between the latch 54 and the base 12.

In one embodiment, the latch 54 further includes a dome 160, aligned along the axis 132, on a top portion 142. The dome 160 preferably provides an area of contact between the latch 54 and a top cover 14 of the disk drive 10.

In some embodiments, the pin 150 is formed integrally with the latch 54. For example, the pin 150 and the latch 54 can be molded or cast as a single unit. Accordingly, the pin 150 and the latch 54 can form a unitary member. The pin 150 can include, in some embodiments, a tapered portion 156 at an end of the pin 150 that is received by the base bore 126.

Some embodiments provide that the latch 54 can be made of a plurality of materials. For example, in some embodiments, the latch 54 can include some portions that are formed, or made, of a polymer and other portions that are formed, or made, of a metal. In some embodiments, the latch 54 can include different polymers that have different physical properties. For example, in some embodiments, the latch 54 can have a polymer with a greater hardness for the pin 150 or the latch engagement member 120 than for the top dome 160 or the latch rearward member 134.

In some embodiments, the latch engagement member 120 is formed of a different material than that of the pin 150. For example, in some embodiments, the engagement portion can be made, or formed, of a polymer, and the pin can be made from a metal. The pin 150 and/or the dome 160 can be overmolded with a polymer to form the remainder of the latch 54, such that the pin 150, made from a metal, and the remained of the latch 54, made from a polymer, form a unitary structure, or are integrally formed, prior to assembly of the latch 54 into the drive 10. Additionally, other parts can include metal or other materials of various densities, and these parts can be overmolded, pressfit, or otherwise attached to form portions of the latch to, for example, provide counterbalances for the latch functions and operations.

In one embodiment, the latch engagement portion 120 is configured to avoid contacting the base 12 when the latch 54 is rotated from a first position, in the non-operation mode, to a second position, in the operation mode. The non-operation mode preferably corresponds to a period when it is desirable for the actuator to not be positioned over the disks 16, which can be a period irrespective of rotation of the disks. For example, the non-operation mode can include a period of time when the disks 16 are rotating, and the non-operation mode, in some embodiments, can be limited to a period of time when the disks 16 are not rotating. The operation mode preferably corresponds to a period of time when it is desirable for the actuator to be positioned over the disks 16. Although this is usually not when the disks 16 are stationary, it is contemplated that there may be times, instances, or periods, when it may be desirable for the actuator to be positioned over the disks irrespective of rotation of the disks. Accordingly, the operation mode, in some embodiments, can be irrespective of rotation of the disks, and in some embodiments, the operation mode can be limited to periods of time, or instances, when the disks are rotating. The latch 54 can include, in some embodiments, a magnetic portion that manipulates or actuates rotation of the latch between the positions corresponding to the operation mode and the non-operation mode.

Some embodiments provide an actuator latch 54, for limiting rotational movement of a disk drive actuator 28, in which the latch 54 includes a coupling portion 56 having an elongate member extending therefrom. The coupling portion 56 can be configured to be rotatable about an axis 132 defined by the elongate member. The elongate member is preferably configured to be received by a bore 126 in a disk drive base 12. The latch 54 can also include an engagement portion 120, integrally formed with the elongate member, extending in a direction transverse to the axis 132 and configured to engage and limit rotation of a disk drive actuator 28.

The latch can further include a dome 160 on a top portion 142 and aligned along the axis 132. The dome can provide an area of contact between the latch 54 and a top cover 14 of the disk drive 10. In some embodiments, the dome 160 contacts the top cover 14 in only certain orientations of the disk drive 10. For example, in some embodiments, the top dome 160 only contacts the top cover 14 when the disk drive 10 is positioned upside-down such that gravitational forces cause the elongate member to slide along the axis of rotation 132, relative to the base bore 126. Other orientations include situations in which a force (e.g., gravitational, centrifugal, etc.) causes the elongate member to slide within the base bore 126.

As explained above with respect to the pin 150, the elongate member and the coupling portion 56 can molded as a single unit. Other permutations of construction are permissible, as explained above with respect to the pin 150 relative to the latch 54.

In some embodiments, the disk drive 10 can include a disk drive base 12 having a coupling portion 125. The coupling portion 125 preferably extends from the base 12 and has a bore 126 therein. The disk drive 10 also preferably includes a latch 54 that includes an integral pin 150 formed therewith. The pin 150 is preferably sized to be received within the bore 126 of the coupling portion 125 and to permit relative rotational movement between the latch 54 and the base 12. The latch 54 is preferably rotatable about an axis of rotation 132 it is when coupled with the coupling portion 125. The latch preferably can be rotated between a first position, where the latch 54 engages a portion of an actuator assembly 28 for limiting rotational movement of the actuator assembly 28, and a second position, where the latch 54 does not engage the actuator assembly 28 or limit rotational movement of the actuator assembly 28.

In one embodiment, the latch 54 contacts the base 12, at a portion of the latch 54 other than the coupling portion 56, in one of the first and second positions and does not contact the base 12 in the other of the first and second positions.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
    a disk drive base having a coupling portion, the coupling portion extending from the base and having a bore therein;
    a disk, rotatably coupled to the disk drive base, the disk having a recordable surface;
    an actuator rotatably coupled to the disk drive base, the actuator having an actuator arm that is rotatable to a position over the recordable surface when the disk drive is in an operation mode and is rotatable to a position substantially not over the recordable surface when the disk drive is in a non-operation mode; and
    a latch that is rotatably coupled, about an axis of rotation, to the coupling portion of the base, the latch having an engagement portion that engages the actuator to limit rotational movement of the actuator when the disk drive is in the non-operation mode and permits rotational movement of the actuator when the disk drive is in the operation mode, the latch having a base portion that forms a pin, and the pin being received by the bore of the base coupling portion to provide relative rotational movement between the latch and the base.

2. The disk drive of claim 1, wherein the latch further comprises a dome, aligned along the axis, on a top portion, the dome providing an area of contact between the latch and a top cover of the disk drive.

3. The disk drive of claim 1, wherein the pin is formed integrally with the latch.

4. The disk drive of claim 3, wherein the pin and the latch are molded as a single unit.

5. The disk drive of claim 1, wherein the pin and the latch form a unitary member.

6. The disk drive of claim 1, wherein the latch comprises a plurality of materials.

7. The disk drive of claim 6, wherein the engagement portion comprises a different material than the pin.

8. The disk drive of claim 1, wherein the engagement portion comprises a polymer.

9. The disk drive of claim 1, wherein the engagement portion is configured to avoid contacting the base when the latch is rotated from a first position in the non-operation mode to a second position in the operation mode.

10. The disk drive of claim 1, wherein the latch comprises a magnetic portion that is manipulated to rotate the latch between the positions for the operation mode and the non-operation mode.

11. The disk drive of claim 1, wherein the pin comprises a tapered portion at an end of the pin that is received by the bore of the base.

12. An actuator latch, for limiting rotational movement of a disk drive actuator, the latch comprising:
    a coupling portion having an elongate member that is configured to be received by a bore in a disk drive base, the coupling portion being configured to be rotatable about an axis defined by the elongate member when the elongate member is received by the bore of the base; and
    an engagement portion, integrally formed with the elongate member, extending in a direction transverse to the axis and configured to engage and limit rotation of a disk drive actuator.

13. The actuator latch of claim 12, wherein the latch further comprises a dome on a top portion and aligned along the axis, the dome providing an area of contact between the latch and a top cover of the disk drive.

14. The actuator latch of claim 12, wherein the elongate member and the coupling portion are molded as a single unit.

15. The actuator latch of claim 12, wherein the latch comprises a plurality of materials.

16. The actuator latch of claim 15, wherein the engagement portion comprises a different material than the elongate member.

17. The actuator latch of claim 12, wherein the engagement portion comprises a polymer.

18. A disk drive comprising:
    a disk drive base having a coupling portion, the coupling portion extending from the base and having a bore therein; and
    a latch comprising an integral pin formed therewith, the pin sized to be received within the bore of the coupling portion and to permit relative rotational movement between the latch and the base; the latch rotatable about an axis of rotation, when coupled with the coupling portion, between a first position, where the latch engages a portion of an actuator assembly for limiting rotational movement of the actuator assembly, and a second position, where the latch does not engage the actuator assembly or limit rotational movement of the actuator assembly.

19. The disk drive of claim 18, wherein the latch further comprises a dome on a top portion, aligned with the axis of rotation, the dome providing a point of contact between the latch and a top cover of the disk drive.

20. The disk drive of claim 18, wherein the latch contacts the base, at a portion of the latch other than a latch coupling portion, in one of the first and second positions and does not contact the base in the other of the first and second positions.

* * * * *